United States Patent [19]
Venditto

[11] Patent Number: 5,615,718
[45] Date of Patent: Apr. 1, 1997

[54] RAIL AND STILE CUTTER

[75] Inventor: Carlo M. Venditto, Clearwater, Fla.

[73] Assignee: Tooltrend, Inc., Oldsmar, Fla.

[21] Appl. No.: 554,456

[22] Filed: Nov. 7, 1995

[51] Int. Cl.⁶ .................................................. B27C 5/00
[52] U.S. Cl. .......................... 144/135.2; 144/3.1; 144/91; 144/231; 144/91.2
[58] Field of Search .................. 144/1.1, 3.1, 36, 144/37, 90.1, 91, 91.2, 134.1, 135.2, 218, 231–236

[56] References Cited

U.S. PATENT DOCUMENTS

| | | | |
|---|---|---|---|
| 1,742,217 | 1/1930 | Renwick | 144/135.2 |
| 1,748,767 | 2/1930 | Heston et al. | 144/135.2 |
| 2,439,486 | 4/1948 | Ray | 144/135.2 |
| 2,563,655 | 8/1951 | Martensson | 144/135.2 |
| 2,582,573 | 1/1952 | Von Gunter | 144/135.2 |
| 3,008,501 | 11/1961 | Hammer | 144/37 |
| 3,289,714 | 12/1966 | Hammer | 144/91 |
| 3,710,833 | 1/1973 | Hammer et al. | 144/135.2 |
| 4,505,086 | 3/1985 | Hansen | 144/231 |

*Primary Examiner*—W. Donald Bray
*Attorney, Agent, or Firm*—Brett J. Trout; G. Brian Pingel

[57] ABSTRACT

A one-piece cutting tool having a cutting profile designed to cut both a rail and stile. The top portion of the tool cuts the rail while the lower portion of the device cuts the stile. The stile is cut with dimensions which fit into the mating alignment with the rail. The tool is also provided with a pair of bearings to guide a workpiece along the cutting tool regardless of whether the tool is being used to cut a rail or a stile. Additionally, no portion of the tool is designed to cut both the rail and the stile, which allows the tool to wear evenly and which prevents premature wear on the tool.

20 Claims, 4 Drawing Sheets

RAIL AND STILE CUTTER

BACKGROUND OF THE INVENTION

1. Field of the Invention

The present invention relates in general to a tool for cutting rails and stiles, and more specifically, to a one-piece tool designed to cut both rails and stiles.

2. Description of the Prior Art

Tools for cutting rails and stiles are well known in the art. Typically, two separate cutting bits are provided, one for cutting the rail, and one for cutting the stile. Although the use of two separate bits produces a quality cut, much of the material used to construct the two separate bits such as the shaft and the securement assembly, must be duplicated in both bits. This duplication of parts adds to the cost and weight of the overall product. Additionally, in a typical router or shaper assembly a guide fence is used which must be removed to allow time-consuming replacement of the rail bit for the stile bit and vice versa.

As an alternative to the two bit system, a one-piece bit is known in the art which allows both the rail and stile to be cut with a single bit. One drawback of this assembly is that in order to reduce the overall cutting surface and therefore the cost of the device, the rail cutting portion of this device overlaps the stile cutting portion. Accordingly, a certain portion of the bit cuts in both the rail cutting and stile cutting procedures. Due to this increased use, this overlapping portion of the bit dulls at twice the rate of the remaining cutting portion of the bit. Since the entire bit must be replaced when any part of the cutting surface becomes worn out, the cutting life of the entire bit is cut in half. Additionally, due to this overlap, it is not possible to secure guide bearings to the shaft on either side of the cutting surface to increase the ease and accuracy of the cutting procedure.

Although the above-described devices are useful to cut rails and stiles in wood, neither of them combine longevity with low cost and ease of use. The present invention is designed to provide a long lasting tool which may be quickly and easily manipulated to cut both rails and stiles with a low cost one-piece tool.

SUMMARY OF THE INVENTION

The present invention provides a cutting tool having a shaft, a body secured to the shaft, and a cutting profile provided on the body. The cutting profile has a rail cutting portion and a stile cutting portion. The rail cutting portion is sufficiently displaced from the stile cutting portion so that the rail cutting portion is not dulled when the cutting tool is used to cut a stile and the stile cutting portion is not dulled when the cutting tool is used to cut a rail.

Preferably, the cutting tool is also provided with a pair of bearings secured to the shaft on either side of the body. The cutting tool is also preferably provided an anti-kickback system which is secured to the body and to prevent the cutting profile from cutting deep enough into a workpiece so that the tool no longer cuts the workpiece but propels the workpiece.

BRIEF DESCRIPTION OF THE DRAWINGS

FIG. 3b is a side elevation in cross-section of the workpiece of FIG. 3a;

FIG. 4b is a side elevation in cross-section of the workpiece of FIG. 4a; and

DETAILED DESCRIPTION OF THE PREFERRED EMBODIMENT

Figure 1:
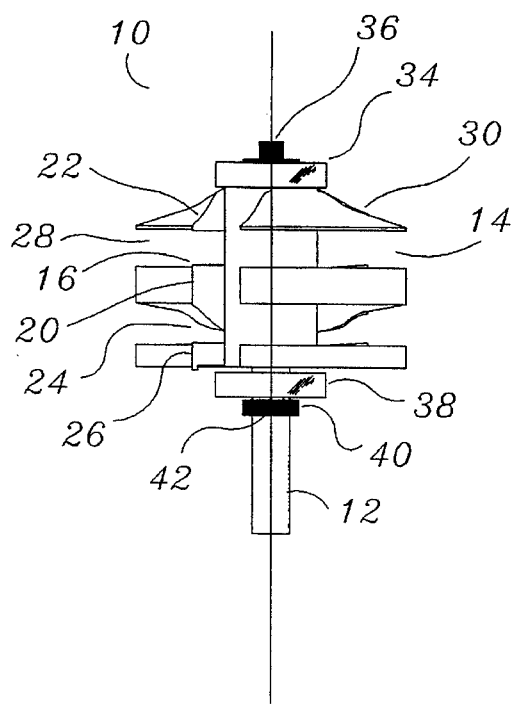
FIG. 1 is a side elevation of the cutting tool of the present invention.

There is shown in the figures a wood cutting tool 10 having a shaft 12 a body 14, a first cutting profile 16 and a second cutting profile 18. Because the first cutting profile 16 and second cutting profile 18 are substantially similar, description will be made relative to only the first cutting profile 16. As shown in FIG. 1, the first cutting profile 16 is constructed of carbide tipped steel by methods known in the art to provide a cutting edge 20. The first cutting profile 16 includes a first bladed tongue 22 which in the drawings is shown in the shape of an ogee. The first cutting profile 16 however, may, of course, be of any desired shape. The first cutting profile 16 is provided with a first bladed groove 24 which is of the same shape as the first bladed tongue 22. The first cutting profile 16 is also provided with a second bladed tongue 26 and a second bladed groove 28 which is of the same shape as the second bladed tongue 26.

Figure 1A:
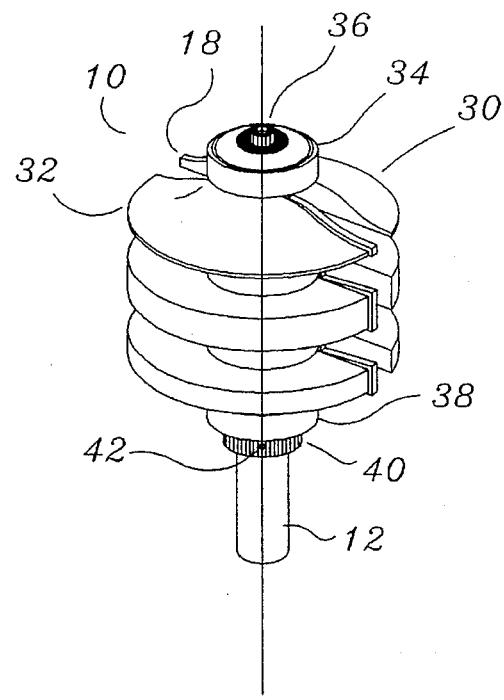
FIG. 1a is a perspective view of the cutting tool of FIG. 1.

The body 14 is provided with a first anti-kickback mechanism 30. The first anti-kickback mechanism 30 extends radially from the shaft 12 a slightly smaller distance from the shaft 12 than the first cutting profile 16. The first anti-kickback mechanism 30 shadows the outline of the first cutting profile 16 except that the first anti-kickback mechanism 30 is slightly smaller in all respects than the first cutting profile 16. The first anti-kickback mechanism 30 extends around the body 14 and merges with the second cutting profile 18. (FIG. 1b) Similarly, a second anti-kickback mechanism 32 of slightly smaller dimensions than the second cutting profile 18 extends around the body 14 to merge with the first cutting profile 16. (FIG. 1a). Provided on the shaft 12 is a first bearing 34 secured to the shaft 12 by a lock bolt 36. A second bearing 38 is secured to the shaft 12 below the second bladed tongue 26 by a stop collar 40. The stop collar 40 is secured directly to the shaft 12 by a set screw 42.

Figure 2:
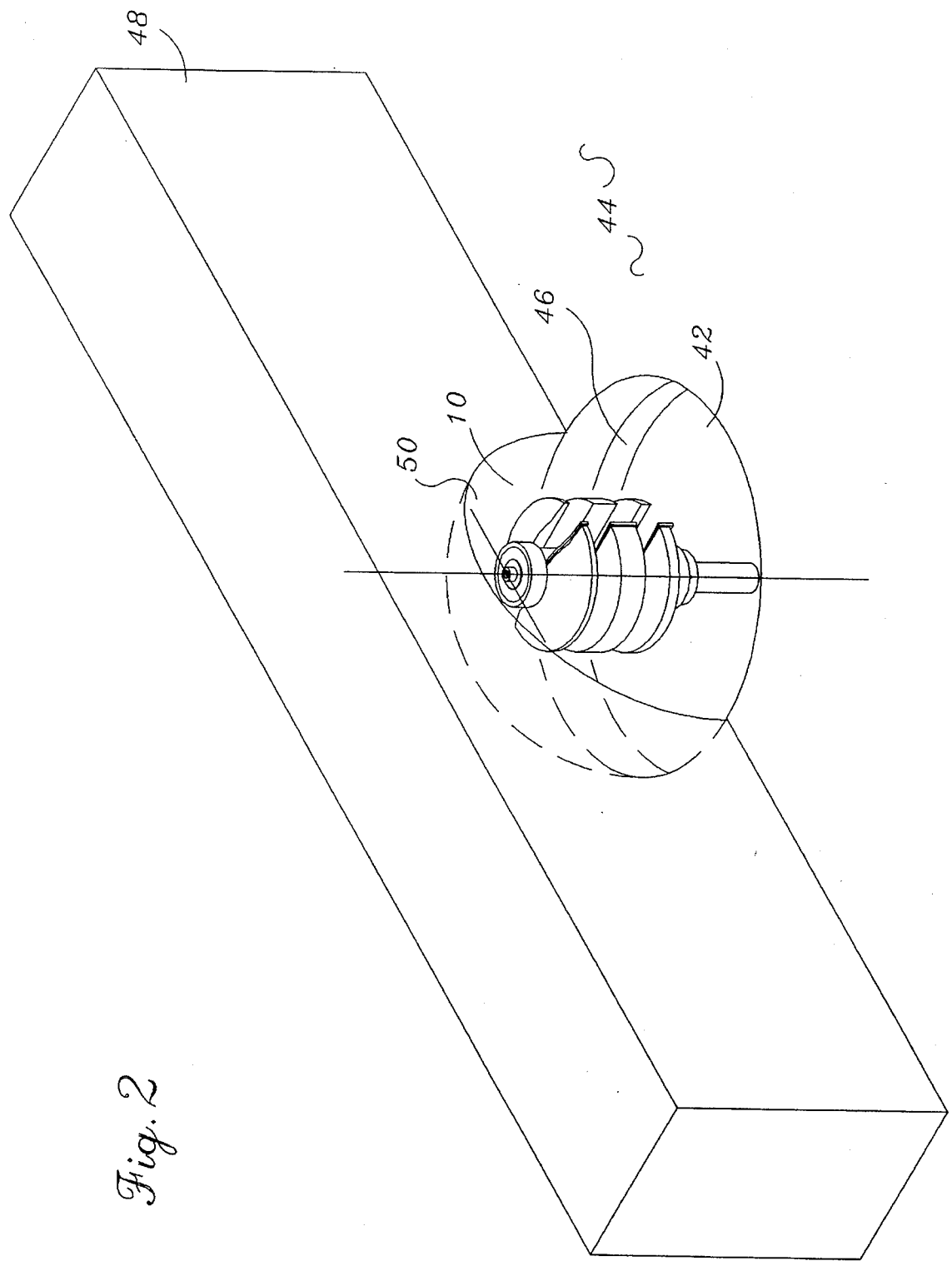
FIG. 2 is a perspective view in partial cutaway showing the cutting tool of FIG. 1 secured to a shaper and positioned under a protective fence.
Figure 3A:
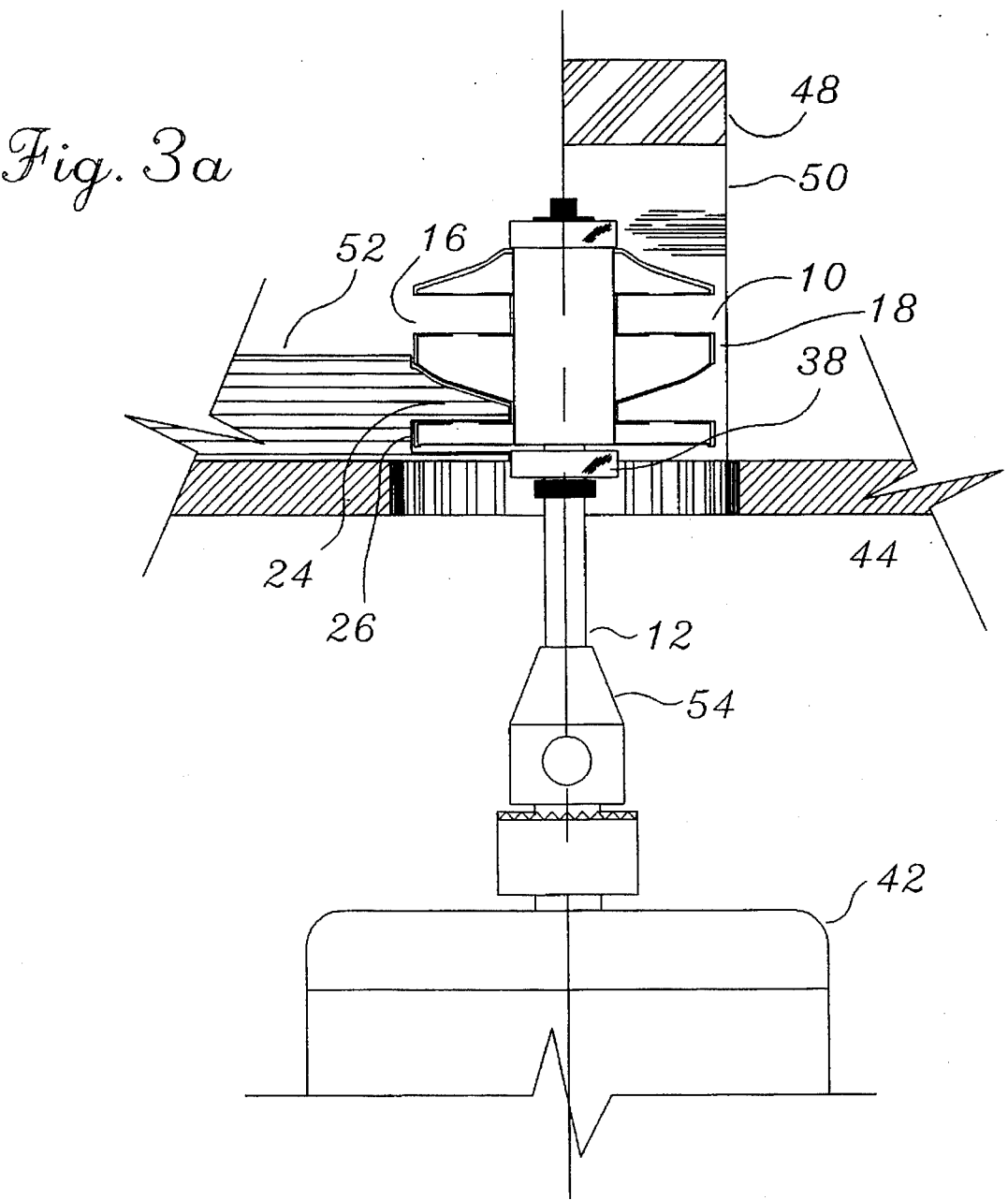
FIG. 3a is a side elevation in cross-section showing the cutting tool of FIG. 1 cutting a stile in a workpiece.

As shown in FIG. 2, the cutting tool 10 is secured to a rotational device such as a shaper or router 42 which, in turn, is secured to the lower portion of a cutting table 44. The cutting table 44 is provided with an aperture 46 to allow the cutting tool 10 to protrude upward through the aperture 46 beyond the surface of the cutting table 44. A fence 48 having an arcuate cutaway 50 is provided over the aperture 46 to provide guidance for a first workpiece 52 as shown in FIG. 3a. The cutting tool 10 is preferably connected to the shaper or router 42 by a chuck 54 or similar attachment device.

Figure 3B:
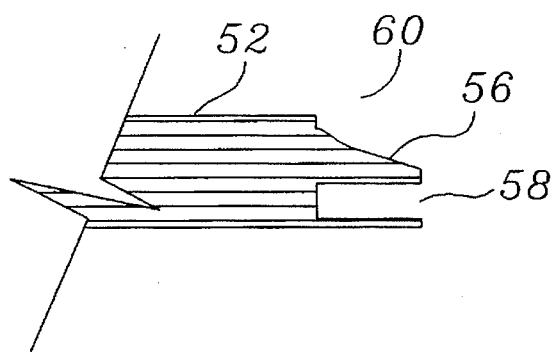

To cut a rail and stile according to the present invention, the cutting tool 10 is secured within the chuck 54 as shown in FIG. 3a. To cut a stile 60, the cutting tool 10 is positioned so that the cutting profiles 16 and 18 extend beyond the surface of the cutting table 44. The fence 48 is then adjusted so that the first bladed groove 24 and the second bladed tongue 26 extend beyond the fence 48 a sufficient distance to cut into the first workpiece 52 a first wood tongue 56 and a second wood groove 58. The first workpiece 52 is moved along a fence 48 and into contact with the cutting tool 10 until the first wood tongue 56 and second wood groove 58 are cut into the first workpiece 52 to create the stile 60. (FIGS. 3a–b). As the first workpiece 52 is moved along the cutting table 44, the second bearing 48 rolls along the first workpiece 52 to prevent the cutting tool 10 from cutting too deeply into the first workpiece 52. The second bearing 48 also prevents the first workpiece 52 from contacting the body 14 of the cutting tool 10 which could burn the first workpiece 52 or damage the cutting tool 10.

Preferably, several cuts are made in the first workpiece 52 with the cutting tool 10 extending only slightly beyond the fence 48. After a shallow cut has been made, the fence 48 is moved to expose more of the cutting tool 10 to cut deeper into the first workpiece 52. In the prior art, if too much of the cutting tool were exposed and the workpiece moved into contact with the cutting tool, instead of cutting the workpiece, the cutting tool would catch and push or propel the workpiece violently away from the cutting tool. This violent propulsion could potentially cause severe damage to the workpiece and/or operator. The anti-kickback mechanisms 30 and 32 of the present cutting tool 10 are designed to substantially eliminate this potentially hazardous situation.

Because the anti-kickback mechanisms 30 and 32 are of nearly the same dimensions as the cutting profiles 16 and 18, it is very difficult to inadvertently place a sufficient portion of the first workpiece 52 into contact with the cutting profiles 16 and 18 to cause the cutting profiles 16 and 18 to push or propel the first workpiece 52 away from the cutting tool 10 instead of cutting the first workpiece 52 as described above. If attempts are made to place too much of the first workpiece 52 into the cutting tool 10, then the first workpiece 52 rides along the anti-kickback mechanisms 30 and 32 until the first workpiece 52 contacts the cutting profiles 16 and 18. With each pass of the cutting tool 10 the cutting profiles 16 and 18 cut deeper into the first workpiece 52 until the first workpiece 52 contacts the bearings 34 or 38 and a cut of a sufficient depth is made.

Figure 4A:
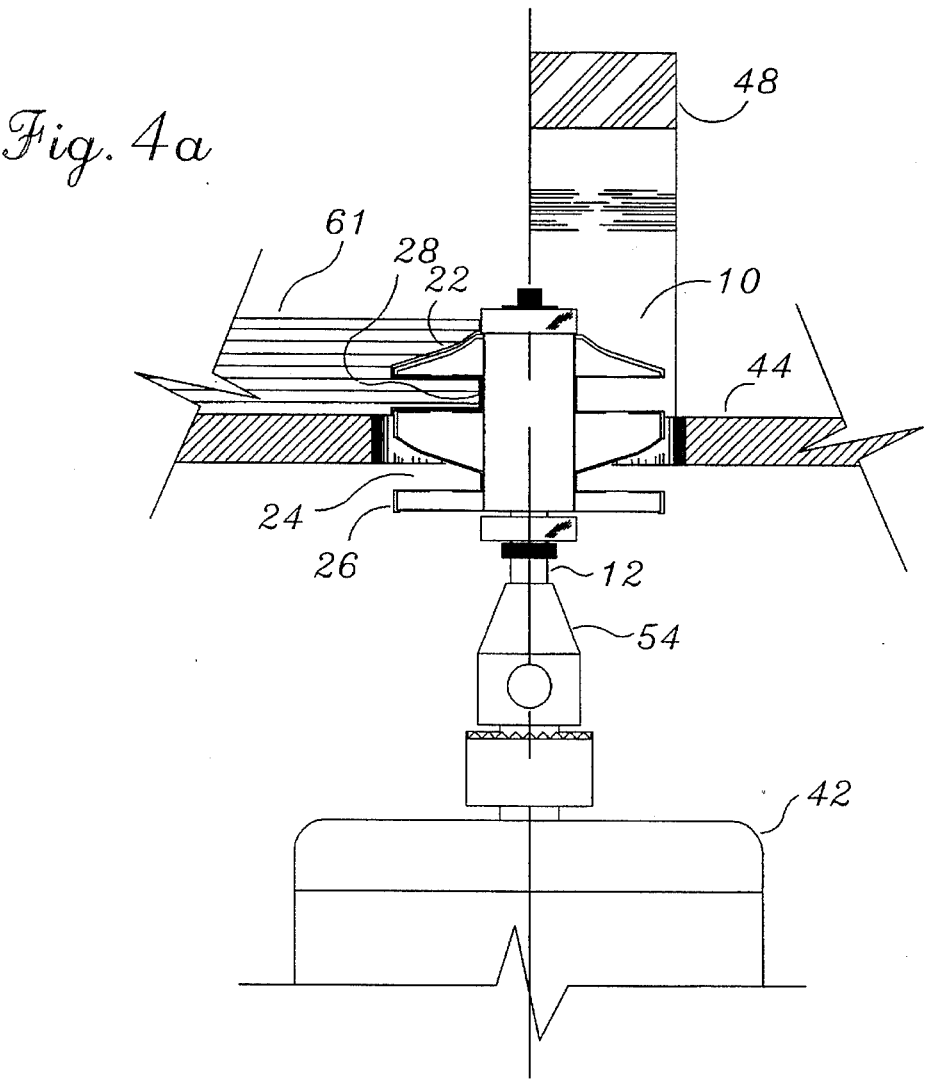
FIG. 4a is a side elevation in cross-section showing the cutting tool of FIG. 1 cutting a rail in a workpiece.
Figure 4B:
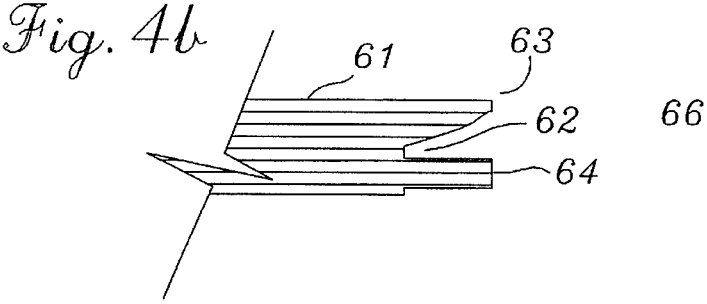
Figure 5:
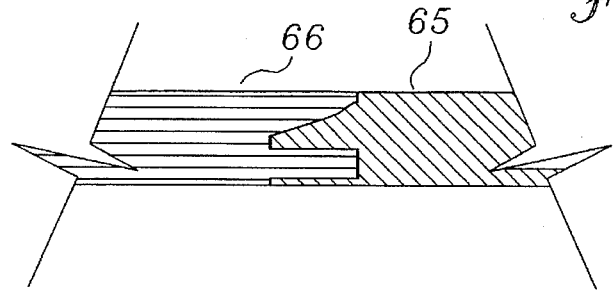
FIG. 5 is a side elevation in cross-section of the workpieces of FIGS. 3b and 4b joined together.

Once the stile 60 has been cut, the chuck 54 is loosened and the shaft 12 of the cutting tool 10 is lowered into the chuck 54 until the first bladed groove 24 and second bladed tongue 26 are positioned below the surface of the cutting table 44. (FIG. 4a). This positioning leaves the first bladed tongue 22 and second bladed groove 28 above the surface of the cutting table 44. A second workpiece 61 is then moved along the fence 48 as the first bladed tongue 22 and second bladed groove 28 cut a first wood groove 62 and a second wood tongue 64 into the second workpiece 61 as shown. Preferably, no portion of the cutting profiles 16 and 18 contact both workpieces 52 and 61. In this way, the cutting profiles 16 and 18 wear evenly, so that the cutting tool 10 need not be prematurely replaced. Once the first wood groove 62 and the second wood tongue 64 have been provided in the second workpiece 61 to create a rail 66, the rail 66 and stile 60 may be fitted together into mating alignment as showing FIG. 5.

Although the invention has been described with respect to a preferred embodiment thereof, it is to be understood that it is not to be so limited, since changes in modifications can be made therein which are within the full intended scope of this invention as defined by the appended claims. For example, it is anticipated that the cutting tool 10 may be used on a shaper, router, or any similar rotational device. It is additionally anticipated that the shapes of the first bladed tongue 22, the second bladed group 28 the first bladed group 24 and the second bladed tongue 28 may be of any desired dimensions.

What is claimed is:

1. A spindled cutting tool comprising:
   (a) a shaft;
   (b) a first bearing secured to said shaft;
   (c) a second bearing secured to said shaft;
   (d) a body secured to said shaft between said first bearing and said second bearing;
   (e) means provided on said body for cutting a stile; and
   (f) means secured to said body for cutting a rail capable of fitting into a mating engagement with said stile.

2. The cutting tool of claim 1, further comprising a stop collar secured to said shaft, wherein said second bearing is positioned between said stop collar and said body.

3. The cutting tool of claim 1, further comprising means for preventing the cutting tool from cutting a workpiece to a depth sufficient to cause the cutting tool to propel said workpiece a distance in excess of one centimeter.

4. The cutting tool of claim 3, wherein said preventing means is a non-cutting guard secured to said body, said non-cutting guard being provided with dimensions similar to said stile cutting means and said rail cutting means, but extending from said shaft a shorter distance than said stile cutting means and said rail cutting means extend from said shaft.

5. The cutting tool of claim 1, wherein said first bearing is of a sufficient diameter to contact a workpiece being cut with a stile by said stile cutting means.

6. The cutting tool of claim 1, wherein said second bearing is of a sufficient diameter to contact a workpiece being cut with a rail by said rail cutting means.

7. The cutting tool of claim 1, wherein said shaft is provided with a securement end capable of being secured to a rotational device, and wherein said stile cutting means is positioned between said securement end and said rail cutting means.

8. The cutting tool of claim 1, wherein said stile cutting means does not overlap said rail cutting means.

9. A vertically spindled wood cutting tool comprising:
   (a) a shaft;
   (b) a first bearing secured to said shaft;
   (c) a second bearing secured to said shaft;
   (d) a body secured to said shaft between said first bearing and said second bearing; and
   (e) a cutting profile provided on said body, said cutting profile comprising:
      (i) a first bladed tongue of a construction capable of cutting a first wood groove;
      (ii) a first bladed groove of a construction capable of cutting a first wood tongue, said first wood tongue being of a shape capable of fitting into mating alignment with said first wood groove;
      (iii) a second bladed tongue of a construction capable of cutting a second wood groove; and
      (iv) a second bladed groove of a construction capable of cutting a second wood tongue, said second wood tongue being of substantially different dimensions than said first wood tongue and being of a shape capable of fitting into mating alignment with said second wood groove.

10. The cutting tool of claim 9, further comprising a stop collar secured to said shaft, wherein said second bearing is positioned between said stop collar and said body.

11. The cutting tool of claim 9, further comprising means for preventing the cutting tool from cutting a workpiece to a depth sufficient to cause the cutting tool to propel said workpiece a distance in excess of one centimeter.

12. The cutting tool of claim 11, wherein said preventing means is a non-cutting guard secured to said body, said non-cutting guard being provided with dimensions similar to said cutting profile, but extending from said shaft a shorter distance than said cutting profile extends from said shaft.

13. The cutting tool of claim 9, wherein said first bearing is of a sufficient diameter to contact a workpiece being cut within a first wood groove by said first bladed tongue.

14. The cutting tool of claim 9, wherein said second bearing is of a sufficient diameter to contact a workpiece being cut with a second wood groove by said second bladed tongue.

15. The cutting tool of claim 9, wherein said shaft is provided with a securement end capable of being secured to a rotational device, and wherein said second bladed tongue is positioned between said first bladed groove and said securement end of said shaft, said first bladed groove is positioned between said second bladed groove and said second bladed tongue, and said second bladed groove is positioned between said first bladed tongue and said first bladed groove.

16. A spindled cutting tool comprising:
 (a) a shaft;
 (b) a body secured to said shaft; and
 (c) a cutting profile provided on said body, said cutting profile having a rail cutting portion and a stile cutting portion, said cutting profile being of a construction wherein said rail cutting portion is spaced sufficiently from said stile cutting portion so as to prevent said rail cutting portion from becoming dulled when the cutting tool is used to cut a stile and wherein said stile cutting portion is spaced sufficiently from said rail cutting portion so as to prevent said stile cutting portion from becoming dulled when the cutting tool is used to cut a rail.

17. The cutting tool of claim 16, further comprising means for preventing the cutting tool from cutting a workpiece to a depth sufficient to cause the cutting tool to propel said workpiece a distance in excess of one centimeter.

18. The cutting tool of claim 17, wherein said preventing means is a non-cutting guard secured to said body, said non-cutting guard being provided with dimensions similar to said cutting profile, but extending from said shaft a shorter distance than said cutting profile extends from said shaft.

19. The cutting tool of claim 18, further comprising a first bearing and a second bearing secured to said shaft, wherein said body is positioned between said first bearing and said second bearing.

20. The cutting tool of claim 16, further comprising a first bearing and a second bearing secured to said shaft, wherein said body is positioned between said first bearing and said second bearing.

* * * * *